(12) United States Patent
Esser

(10) Patent No.: US 8,770,590 B2
(45) Date of Patent: Jul. 8, 2014

(54) OIL CONTROL RING

(75) Inventor: Peter Esser, Kurten (DE)

(73) Assignee: Federal-Mogul Burscheid GmbH, Burscheid (DE)

(*) Notice: Subject to any disclaimer, the term of this patent is extended or adjusted under 35 U.S.C. 154(b) by 0 days.

(21) Appl. No.: 13/576,459

(22) PCT Filed: Nov. 9, 2010

(86) PCT No.: PCT/EP2010/067074
§ 371 (c)(1),
(2), (4) Date: Aug. 1, 2012

(87) PCT Pub. No.: WO2011/091876
PCT Pub. Date: Aug. 4, 2011

(65) Prior Publication Data
US 2012/0298067 A1  Nov. 29, 2012

(30) Foreign Application Priority Data
Feb. 1, 2010  (DE) .......................... 10 2010 001 434

(51) Int. Cl.
*F16J 9/12*  (2006.01)
*F16J 15/00*  (2006.01)
*F16J 9/20*  (2006.01)

(52) U.S. Cl.
CPC ..................... *F16J 9/203* (2013.01)
USPC ........ 277/459; 123/193.6; 277/345; 277/434; 277/460

(58) Field of Classification Search
USPC ............ 123/193.1, 193.6; 277/345, 434, 459, 277/460
See application file for complete search history.

(56) References Cited

U.S. PATENT DOCUMENTS

| | | | | |
|---|---|---|---|---|
| 2,511,874 A * | 6/1950 | Phillips | ........................ | 277/444 |
| 2,640,746 A * | 6/1953 | Phillips et al. | ................ | 277/444 |
| 2,696,038 A * | 12/1954 | Hunt | ........................ | 29/888.074 |
| 2,715,556 A * | 8/1955 | Prasse | ........................ | 277/461 |
| 3,066,943 A * | 12/1962 | Brenneke | ...................... | 277/462 |
| 3,435,502 A * | 4/1969 | Morgan et al. | ........... | 29/888.074 |
| 4,085,490 A * | 4/1978 | McCormick et al. | ........ | 148/589 |
| 4,214,762 A * | 7/1980 | McCormick et al. | ........ | 277/444 |
| 4,522,412 A * | 6/1985 | Kubo | ........................ | 277/443 |
| 4,629,200 A * | 12/1986 | Ruddy | ........................ | 277/463 |
| 4,974,498 A * | 12/1990 | Lemelson | ........................ | 92/223 |
| 5,779,243 A * | 7/1998 | Hanlon | ........................ | 277/434 |
| 6,116,204 A * | 9/2000 | Katsaounis | ................ | 123/193.6 |
| 6,199,274 B1 * | 3/2001 | Preyer | ........................ | 29/888.074 |
| 6,651,606 B2 * | 11/2003 | Han | ........................ | 123/193.6 |
| 7,117,594 B2 * | 10/2006 | Preyer | ........................ | 29/888.07 |
| 2003/0079709 A1 * | 5/2003 | Han | ........................ | 123/193.6 |

(Continued)

FOREIGN PATENT DOCUMENTS

| | | | |
|---|---|---|---|
| DE | 1065235 B | 9/1959 | |
| EP | 1936245 A1 * | 6/2008 | ............ F16J 9/20 |

(Continued)

*Primary Examiner* — Lindsay Low
*Assistant Examiner* — Tea Holbrook
(74) *Attorney, Agent, or Firm* — Robert L. Stearns; Dickinson Wright, PLLC

(57) ABSTRACT

An oil scraper piston ring includes a ring body having two radial outer running webs on the ring body, which are arranged one behind the other in relation to the run direction of the piston and are spaced apart from one another by an external depression. Each running web respectively has two scraper lips and a wear protection coating is provided on each scraper lip.

15 Claims, 3 Drawing Sheets

(56) References Cited

U.S. PATENT DOCUMENTS

| | | | |
|---|---|---|---|
| 2003/0101958 A1* | 6/2003 | Han | 123/193.6 |
| 2003/0154947 A1* | 8/2003 | Han | 123/193.6 |
| 2004/0021270 A1* | 2/2004 | Takizawa et al. | 277/434 |
| 2006/0102131 A1* | 5/2006 | Han | 123/193.4 |
| 2007/0262533 A1* | 11/2007 | Lu | 277/434 |
| 2008/0252019 A1* | 10/2008 | Yu | 277/434 |
| 2011/0309586 A1* | 12/2011 | Esser | 277/442 |
| 2012/0126488 A1* | 5/2012 | Avelar Arajo | 277/443 |

FOREIGN PATENT DOCUMENTS

| | | | |
|---|---|---|---|
| GB | 652143 A | 4/1951 | |
| WO | WO2010/124353 A1 | 11/2010 | |
| WO | WO 2010124353 A1 * | 11/2010 | F16J 9/06 |

\* cited by examiner

OIL CONTROL RING

BACKGROUND OF THE INVENTION

1. Technical Field

The present invention relates to an oil scraper ring for the piston of an internal combustion engine. In particular, it relates to an oil scraper ring having improved oil scraping and improved wear behavior.

2. Related Art

Oil scraper rings are used in internal combustion engines for the purpose of minimizing the oil consumption of the internal combustion engine and simultaneously ensuring sufficient lubrication between piston and cylinder wall. For this purpose, the oil scraper ring must have two properties, between which a compromise is to be found. On the one hand, it must scrape off as much oil as possible from the cylinder wall during the downward movement of the piston, i.e., in the direction of the oil chamber, in order to minimize the oil consumption. On the other hand, at all times a minimal oil film must be maintained between the oil scraper ring and the cylinder wall, in order to keep the friction and therefore the wear low.

The compromise found is to be maintained over long operating time periods of the engine. For this purpose, the wear on the oil scraper ring must be kept low, because otherwise the gap between oil scraper ring and cylinder wall enlarges and the oil consumption rises.

Currently, only oil scraper rings having fully coated running webs are known (so-called monocoating).

SUMMARY OF THE INVENTION

The invention is therefore based on the object of providing an improved oil scraper ring. The offset of the two scraper lips corresponds to the coating thickness. Through the arrangement of the scraper lips axially and radially, tripling of the service life results. Homogeneous deposition of the PVD or DLC layer is provided by the adaptation of the flank angles of the scraper lips.

According to one aspect of the invention, an oil scraper piston ring is provided, comprising
  a ring body;
  two radial outer running webs on the ring body, which are arranged one behind the other in relation to the run direction of the piston and are spaced apart from one another by an external depression;
  each running web respectively having two scraper lips; and
  a wear protection coating on each scraper lip.

The desired contours in the running webs, i.e., above all the scraper lips, can be introduced into the webs by mechanical machining of the webs or special drawing processes in the case of steel profiles.

The width of the ring body in the run direction is preferably between 1.5 and 3 mm.

The running webs are preferably spaced apart by approximately 0.6 mm from one another and have a radial height of preferably 0.2 to 0.7 mm, particularly preferably 0.45 mm (corresponding to the radial height of the depression).

The radial height of the scraper lips is preferably approximately 0.082 mm. The width of the running surface of the scraper lips in the run direction is preferably between 0.01 and 0.2 mm, particularly preferably 0.05 mm.

The layer thickness of the wear protection coating is preferably between 1 and 30 μm.

According to one embodiment, all scraper lips have essentially the same radial height.

According to one embodiment, the combustion-chamber-side scraper lip of at least one running web has a greater radial height than the oil-chamber-side scraper lip of the running web.

In this embodiment, at least one oil-chamber-side scraper lip is set back radially in relation to the combustion-chamber-side scraper lip.

According to one embodiment, the at least one radially taller scraper lip is the combustion-chamber-side scraper lip of the combustion-chamber-side running web.

The radially taller scraper lip is preferably that of the combustion-chamber-side running web.

According to one embodiment, the combustion-chamber-side scraper lip of each running web has a greater radial height than the oil-chamber-side scraper lip of the running web.

According to one embodiment, the radial height difference essentially corresponds to the thickness of the wear protection coating of the scraper lips.

I.e., the radially shorter oil-chamber-side scraper lip is set back by approximately the coating thickness of the wear protection layer in relation to the radially taller combustion-chamber-side scraper lip.

According to one embodiment, the wear protection coating of the scraper lips extends uninterrupted in the region between the scraper lips.

According to one embodiment, the scraper lips taper outward.

This can be achieved, for example, by a substantially conical shape of the scraper lips.

According to one embodiment, the combustion-chamber-side flank of each scraper lip is steeper in relation to the run direction than the respective oil-chamber-side flank.

According to one embodiment, the oil-chamber-side flank of the combustion-chamber-side scraper lip of one running web or all running webs is steeper in relation to the run direction than the oil-chamber-side flank of the oil-chamber-side scraper lip of the respective running web.

According to one embodiment, the outer depression between the running webs is deeper than the region between the scraper lips.

According to one embodiment, the wear protection coating between the scraper lips is radially at least as tall as the scraper lips.

In this way, upon wear of the wear protection coating down to the running surfaces of the scraper lips, a fully-chamfered ring web having self-sharpening corners results. The residue of the wear protection coating then remains between the scraper lips.

According to one embodiment, the inner flanks of the running webs are steeper in relation to the run direction than the outer flanks.

According to one embodiment, the inner flank of the oil-chamber-side running web is steeper in relation to the run direction than the inner flank of the combustion-chamber-side running web.

According to a further aspect of the invention, a piston for an internal combustion engine is provided, comprising at least one above-described oil scraper piston ring.

THE DRAWINGS

DETAILED DESCRIPTION

Figure 1:
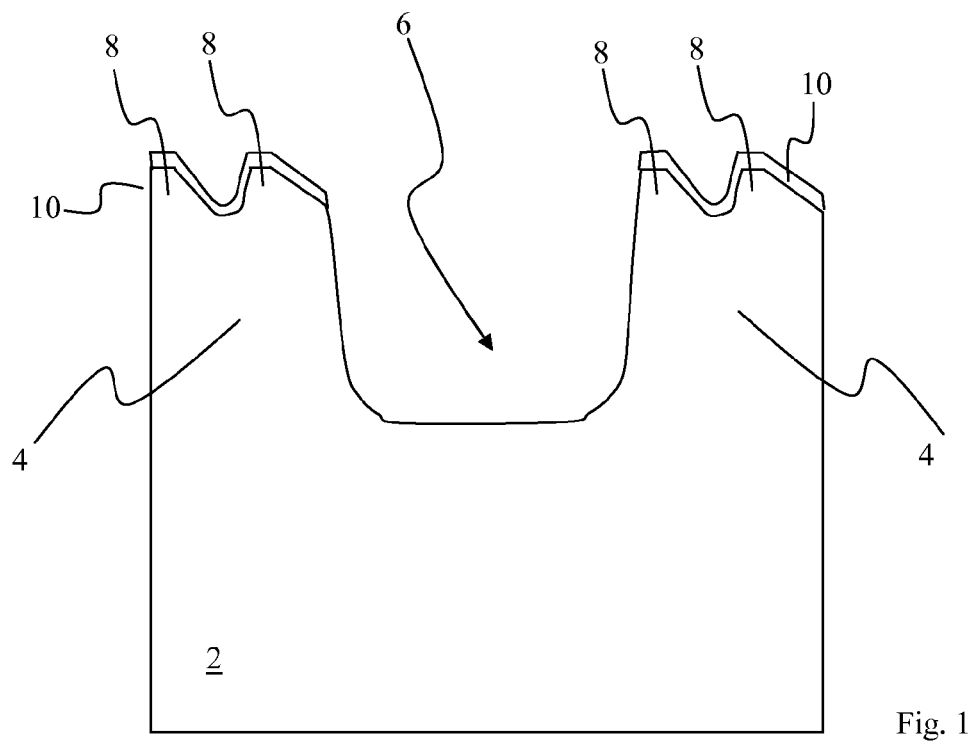
FIG. 1 shows an embodiment of an oil scraper piston ring according to the invention in cross-section.

FIG. 1 shows a first embodiment of the oil scraper piston ring according to the invention in cross-section. In these and the further figures, the cylinder wall side of the oil scraper ring is on top, the piston side is on the bottom, the combustion chamber side is on the left, and the oil chamber or crankcase side is on the right. The oil scraper ring comprises a ring body 2, which is provided on each flank side with a running web 4. The running webs 4 do not necessarily have to be arranged directly on the flanks of the ring body 2, but rather can also be offset inward.

The running webs 4 are spaced apart from one another by an outer depression 6. Two scraper lips 8 are located on each of the running webs 4. The scraper lips 8 are provided with a wear protection coating 10. The depression 6 is significantly deeper than the region between the scraper lips 8. An improved scraping effect is achieved by the increase of the number of the scraper lips to four.

The coating can contain chromium (Cr) or diamond-like carbon (DLC). For example, it can be applied by means of physical deposition from the gas phase (physical vapor deposition, PVD).

Figure 2:
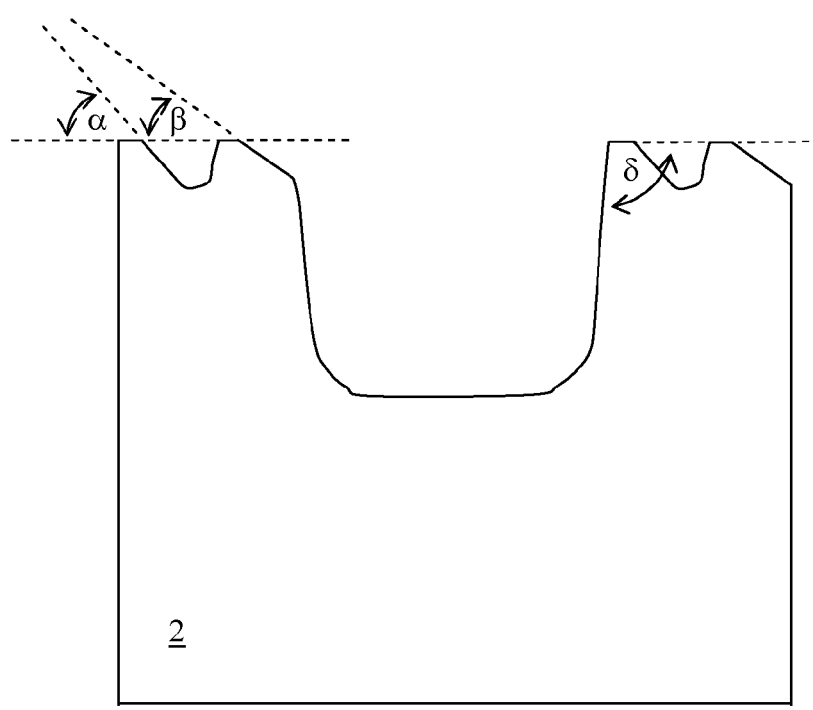
FIG. 2 shows the slopes of various scraper lips of the embodiment of FIG. 1 in a cross-sectional view.

FIG. 2 shows the slopes of the scraper lips and running webs in an embodiment as in FIG. 1. However, the coating is not shown here for a better overview.

As can be seen in FIG. 2, the oil-chamber-side flank of the combustion-chamber-side scraper lip is steeper than the oil-chamber-side flank of the oil-chamber-side scraper lip (only shown for the left running web here as an example, but the other running web can have the same slope ratios).

All of the angles mentioned hereafter correspond respectively to the angle in relation to the run direction of the oil scraper ring, which is less than or equal to 90°.

Exemplary values for the slope a of the oil-chamber-side flank of the combustion-chamber-side scraper lip include 25-50°, particularly preferably 40°. Exemplary values for the slope β of the oil-chamber-side flank of the oil-chamber-side scraper lip include 15-40°, particularly preferably 30°.

The slope δ of the inner flank of the oil-chamber-side running web is preferably between 89 and 80° (1-10° perpendicular to the run direction), particularly preferably 82.4° (7.6° perpendicular to the run direction). The inner flank of the combustion-chamber-side running web is preferably between 89 and 80°, particularly preferably 83.7°. The slopes of the inner flanks of the running webs can be equal, but the slope of the inner flank of the oil-chamber-side running web is preferably greater.

Figure 3:
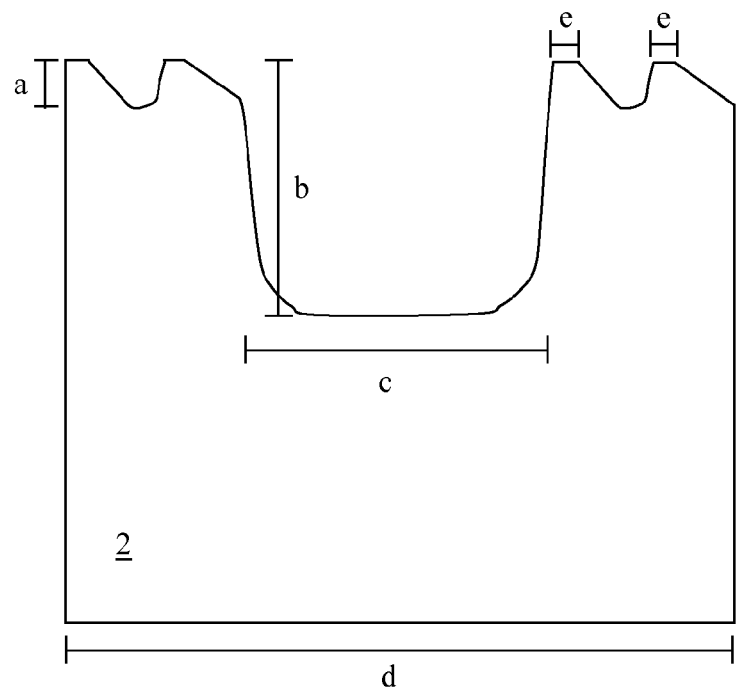
FIG. 3 shows dimensions of the embodiment of FIG. 1 in a cross-sectional view.

FIG. 3 shows various dimensions in an embodiment as shown in FIG. 1. For the sake of a better overview, however, the coating is not shown here.

The width d of the ring body in the run direction is preferably between 1.5 and 3 mm. The radial height b of the depression or the radial height of the running webs is preferably between 0.2 and 0.7 mm, particularly preferably 0.45 mm. The width c of the depression is preferably 0.6 mm.

The radial height a of the scraper lips is preferably 0.082 mm. The width e of the running surface of the scraper lips in the run direction is preferably between 0.01 and 0.2 mm, preferably 0.05 mm.

Figure 4:
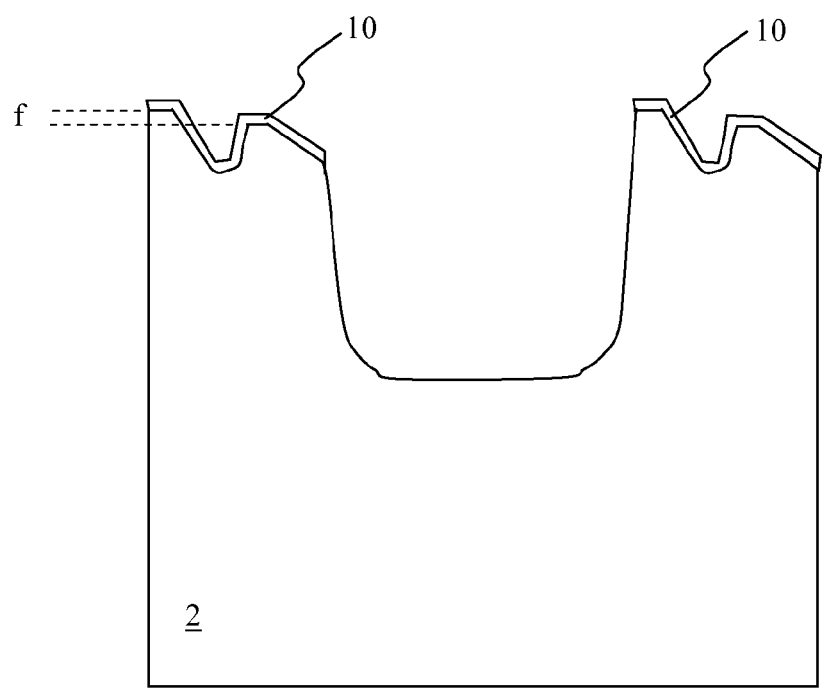
FIG. 4 shows an alternative embodiment of an oil scraper piston ring according to the invention in cross-section.

FIG. 4 shows an embodiment which is otherwise similar to that of FIG. 1. The optional feature is shown here that the radial height of the respective oil-chamber-side scraper lips of each running web is decreased by the coating thickness f of the wear protection coating. In other words, the oil-chamber-side scraper lips are set back by the coating thickness f. The coating thickness f is preferably in the range of 1 to 30 µm.

Figure 5:
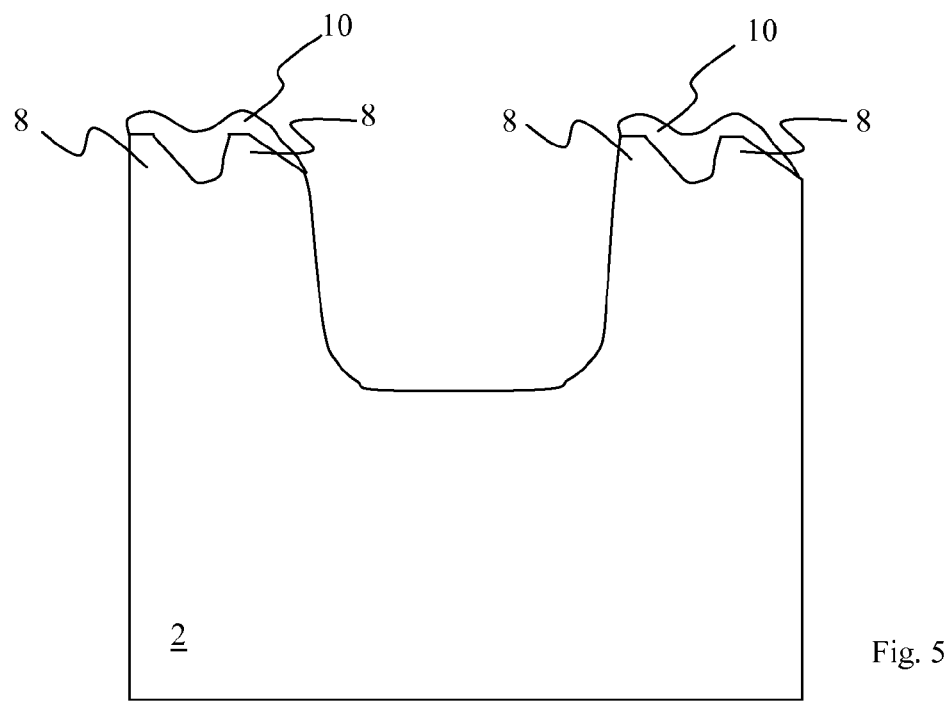
FIG. 5 shows a further alternative embodiment of an oil scraper piston ring according to the invention in a cross-section.

FIG. 5 shows a further alternative embodiment which is otherwise similar to that of FIG. 1. The optional feature is shown here that the wear protection coating 10 in the region between the scraper lips 8 is radially at least as tall as the scraper lips 8.

Figure 6:
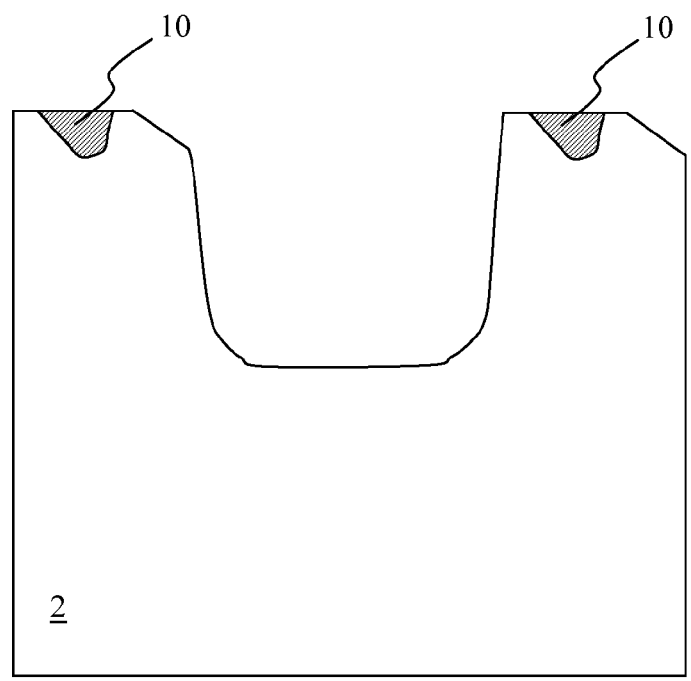
FIG. 6 shows the embodiment of FIG. 4 after wear of all scraper lips in cross-section.

FIG. 6 shows the state of the embodiment of FIG. 5 after the wear protection coating 10 has been worn down to the scraper lips 8. In this case, in this embodiment the oil scraper ring merges into a fully-chamfered web version. An additional wear layer which has self-sharpening web corners thus arises.

The invention claimed is:

1. An oil scraper piston ring, comprising:
a ring body;
two radial outer running webs on the ring body, which are arranged one behind the other in spaced apart relation from one another by an external depression;
wherein each running web, respectively, has two scraper lips; and
a wear protection coating covering the running surface of each scraper lip.

2. The oil scraper piston ring according to claim 1, wherein all scraper lips have a radial height that is substantially the same.

3. The oil scraper piston ring according to claim 1, wherein the two scraper lips of each running web includes an oil-chamber-side scraper lip and a combustion-chamber-side scraper lip and wherein the combustion-chamber-side scraper lip of at least one of the webs has a radial height that is greater than that of the associated oil-chamber-side scraper lip of the at least one web.

4. The oil scraper piston ring according to claim 3, wherein the two running webs include a combustion-chamber-side web adjacent one side of the ring body and an oil-chamber-side running web adjacent the opposite side of the ring body, and wherein the at least one radially greater height scraper lip is on the combustion-chamber-side running web.

5. The oil scraper piston ring according to claim 4, wherein the wear protection coating has a coating thickness and wherein the radial height difference between the scraper lips substantially corresponds to the coating thickness of the scraper lips.

6. The oil scraper piston ring according to claim 3, wherein the combustion-chamber-side scraper lip of each running web has a greater radial height than the oil-chamber-side scraper lip of each running web.

7. The oil scraper piston ring according to claim 1, wherein the wear protection coating of the scraper lips extends uninterrupted in the region between the scraper lips.

8. The oil scraper piston ring according to claim 1, wherein the scraper lips taper radially outward.

9. The oil scraper piston ring according to claim 8, wherein a combustion-chamber-side flank of each scraper lip is steeper in relation to a run direction of the ring than an oil-chamber-side flank of each scraper lip.

10. The oil scraper piston ring according to claim 8, wherein a flank of a combustion-chamber-side scraper lip of one running web that would face away from the combustion chamber when installed is steeper in the run direction in relation to an oil-chamber-side flank of an oil-chamber-side scraper lip of the running web.

11. The oil scraper piston ring according to claim 1, wherein the external depression between the running webs is deeper than a depression provided between the scraper lips of each web.

12. The oil scraper piston ring according to claim 1, wherein the wear protection coating between the scraper lips is at least as tall radially as the scraper lips.

13. The oil scraper piston ring according to claim 1, wherein outer flanks of the running webs are steeper in relation to a run direction of the oil scraper piston ring than are inner flanks of the running webs.

14. The oil scraper piston ring according to claim 1, wherein an inner flank of an oil-chamber-side one of the running webs is steeper in relation to a run direction of the piston ring than an inner flank of a combustion-chamber-side one of the running webs.

15. A piston for an internal combustion engine, comprising at least one oil scraper piston ring according to claim 1.

\* \* \* \* \*